United States Patent [19]

Dumbaugh, Jr. et al.

[11] Patent Number: 5,116,789
[45] Date of Patent: May 26, 1992

[54] STRONTIUM ALUMINOSILICATE GLASSES FOR FLAT PANEL DISPLAYS

[75] Inventors: William H. Dumbaugh, Jr., Painted Post; Josef C. Lapp, Corning, both of N.Y.

[73] Assignee: Corning Incorporated, Corning, N.Y.

[21] Appl. No.: 743,802

[22] Filed: Aug. 12, 1991

[51] Int. Cl.$^5$ .................... C03C 3/085; C03C 3/091
[52] U.S. Cl. .................... 501/66; 340/719; 359/82; 501/69
[58] Field of Search .................... 501/66, 69; 340/719; 359/82

[56] References Cited

U.S. PATENT DOCUMENTS 4,634,683 1/1987 Dumbaugh, Jr. .................... 501/69
4,634,684 1/1987 Dumbargh, Jr. .................... 501/69
4,824,808 4/1989 Dumbaugh, Jr. .................... 501/66

*Primary Examiner*—Mark L. Bell
*Attorney, Agent, or Firm*—C. S. Janes, Jr.

[57] ABSTRACT

The invention is concerned with glasses for use as substrates in flat panel display devices which use polycrystalline silicon thin film transistors. The compositions for these glasses are essentially free from alkali metal oxides and MgO and consist essentially, in mole percent, of:

| | | | |
|---|---|---|---|
| $SiO_2$ | 65-75 | CaO and/or BaO | 0-10 |
| $Al_2O_3$ | 6-10 | $B_2O_3$ | 0-5 |
| SrO | 15-26 | [CaO and/or BaO] + $B_2O_3$ | 0-12 |

1 Claim, No Drawings

STRONTIUM ALUMINOSILICATE GLASSES FOR FLAT PANEL DISPLAYS

RELATED APPLICATIONS

U.S. application Ser. No. 07/743,799, filed concurrently herewith by W. H. Dumbaugh, Jr. under the title HIGH ALUMINA, ALKALINE EARTH BOROSILICATE GLASSES FOR FLAT PANEL DISPLAYS, discloses glasses designed for use as substrates in flat panel display devices utilizing polycrystalline silicon thin film transistors. The glasses disclosed therein exhibited strain points higher than 625° C., liquidus temperatures below 1075° C., long term stability against devitrification, liquidus viscosities greater than $1.5 \times 10^5$ poises, and having compositions essentially free from alkali metal oxides and MgO while consisting essentially, in mole percent, of:

| | | | |
|---|---|---|---|
| $SiO_2$ | 63–68 | BaO | 4.5–10 |
| $Al_2O_3$ | 7.5–11 | CaO + SrO + BaO | 14–26 |
| CaO | 9.5–16 | $B_2O_3$ | 1–7 |
| SrO | 0–5 | | |

U.S. application Ser. No. 07/743,800, filed concurrently herewith by W. H. Dumbaugh, Jr. under the title ALKALINE EARTH ALUMINOBOROSILICATE GLASSES FOR FLAT PANEL DISPLAYS, is directed to glasses designed for use as substrates in flat panel display devices utilizing polycrystalline silicon thin film transistors. The glasses disclosed therein exhibit strain points higher than 675° C., liquidus temperatures below 1125° C., long term stability against devitrification, and having compositions essentially free from alkali metal oxides while consisting essentially, in mole percent, of:

| | | | |
|---|---|---|---|
| $SiO_2$ | 60–65 | BaO | 4.5–10 |
| $Al_2O_3$ | 8–10 | MgO + CaO + SrO + BaO | 23–28 |
| CaO | 11–24 | $B_2O_3$ | 1–4 |
| SrO | 0–12 | MgO | 0–4 |

BACKGROUND OF THE INVENTION

Glass has been chosen as a substrate in liquid crystal display devices for several reasons: (1) it is transparent; (2) it can withstand the chemical and physical conditions to which it is exposed during display processing; and (3) it can be manufactured at reasonable cost in thin sheets with precisely controlled dimensions. Liquid crystal displays are passive displays which are dependent upon external sources of light for illumination. They are fabricated as segmented displays or in one of two basic matrix configurations. The substrate needs of the two types differ. The first type is intrinsic matrix addressed, relying upon the threshold properties of the liquid crystal material. The second type is extrinsic matrix or active matrix addressed, in which an array of diodes, metal-insulator-metal devices or thin film transistors (TFTs) supplies an electronic switch to each pixel. In both designs, however, two sheets of glass form the structure of the display.

Intrinsically addressed liquid crystal displays are fabricated employing thin film deposition at temperatures of about 350° C., followed by photolithographic patterning. Because of the low temperature requirements involved in the process, soda lime silicate glass having a silica barrier layer thereon to prevent migration of Na+ ions has been used extensively as substrates therefor. A higher performance version of intrinsically addressed liquid crystal displays, termed the super twisted nematic, has an added substrate requirement of extremely precise flatness. That requirement has demanded that the soda lime silicate glasses employed in the displays be polished. Alternatively, Corning Code 7059 glass, a barium boroaluminosilicate glass marketed by Corning Incorporated, Corning, N.Y., which is precision formed into sheet requiring no surface polishing utilizing the downdraw fusion pipe, such as is described in U.S. Pat. Nos. 3,338,696 (Dockerty) and 3,682,609 (Dockerty) has been employed.

Extrinsically addressed liquid crystal displays can be subdivided into two categories: the first based upon metal-insulator-metal or amorphous silicon (a-Si) devices; and the second based upon polycrystalline silicon (poly-Si) devices. Devices formed from poly-Si are processed at substantially higher temperatures than those employed with a-Si thin film transistors. Those temperatures have demanded the use of glasses exhibiting higher strain points than soda lime silicate glasses and Corning Code 7059 glass to preclude thermal deformation of the sheet during processing.

The lower the strain point of the glass, the greater this dimensional change. One means for correcting this problem is to anneal the glass sheet after forming; a process adding significant cost. A more economical solution to that problem is to design glasses with high strain points so the dimensional change is minimal during device processing at about 600° C.

Contamination of thin film transistors by sodium migrating from the glass substrate is a major concern during processing. That problem has led to the use of a coating on the substrate glass to provide a barrier to the migration of the alkali.

Therefore, the principal objective of the present invention was to devise glass compositions operable as substrates in liquid crystal display devices utilizing poly-Si thin film transistors, the glass compositions being essentially free from alkali metal oxides, being relatively inert to the chemicals used in display processing, having a strain point higher than 625° C., and, most vitally, exhibiting long term stability against devitrification when in contact with platinum metal and high temperature refractory ceramic materials utilized in the downdraw fusion pipe referred to above for precision forming thin glass sheeting.

SUMMARY OF THE INVENTION

As has been indicated above, a most critical requirement which the inventive glass must satisfy is its resistance to the development of devitrification when exposed for very long periods to platinum metal and ceramic materials of high refractoriness at temperatures where the glass exhibits a viscosity of about $10^4$–$10^6$ poises. The drawing of glass sheet utilizing a fusion pipe does not impart the very fast quenching action of conventional pressing processes of shaping glass articles. By the very nature of the process, molten glass may remain in contact with the refractory component of the melting unit for as long as 30 days.

It is very difficult to evaluate in the laboratory the tendency of a glass to devitrify under the conditions present in drawing glass sheet. As a first approximation, a "liquidus" measurement is used. In reality, however, because of the method used in the laboratory, this measurement is not a true liquidus. Thus, the measuring technique involves placing crushed glass in a platinum boat which is then introduced into a gradient furnace having a temperature spread spanning the range wherein the liquidus is thought to be located. After 24 hours the boat is removed from the furnace, allowed to cool, the glass removed from the boat, thin sections prepared from the glass, and those thin sections examined microscopically. A measurement is made of the maximum temperature at which crystals are observed. The viscosity corresponding to this "liquidus" temperature provides the first estimate as to whether a particular glass is close to acceptability.

The critical viscosity for forming glass sheeting utilizing the downdraw fusion pipe process is about $1-3 \times 10^5$ poises. Accordingly, to better evaluate the devitrification proclivity of a glass for use in the process, a solid piece of the glass is heated to temperature well above the liquidus while in contact with platinum or a highly refractory ceramic material, such as alumina or zircon, depending upon the fusion pipe material most suitable for a given glass composition. Thereafter, the molten glass is cooled to a viscosity within the glass forming range and that temperature is held for seven days. The sample is thereafter visually examined for the presence of crystals. Because the inventive glasses are designed to be used in forming sheet via the downdraw fusion pipe process, the glasses will exhibit a viscosity at the liquidus temperature greater than about $1.5 \times 10^5$ poises.

Corning Code 7059 glass, consisting essentially, expressed in terms of weight percent on the oxide basis, of about 25% BaO, 10% $Al_2O_3$, 15% $B_2O_3$, and 50% $SiO_2$, exhibits an annealing point of 639° C., a strain point of 593° C., and a linear coefficient of thermal expansion (25°-300° C.) of $46 \times 10^{-7}$/°C. Because of its freedom from alkali metal oxide and its utility in forming thin glass sheet via the downdraw fusion pipe process, Corning Code 7059 glass has been used extensively as a substrate in a-Si devices. In an effort to devise glasses for use as substrates in poly-Si devices, a research program was initiated to develop glasses demonstrating higher strain points and other properties superior to Code 7059 glass, such as to render them applicable as substrates for liquid crystal displays utilizing polycrystalline silicon thin film transistors.

As a result of the above research program, a series of glasses was discovered in the strontium aluminosilicate system demonstrating annealing and strain points substantially higher than those exhibited by Corning Code 7059. Thus, the present inventive glasses demonstrate strain points over 675° C., annealing points above 725° C., and consist essentially, expressed in terms of mole percent on the oxide basis, of 15-26% SrO, 6-10% $Al_2O_3$, and 65-75% $SiO_2$. Maintenance of the individual components within the stated ranges is necessary to assure the development of the desired properties in the glass. For example, excess $SiO_2$ results in a glass which is too viscous; excess $Al_2O_3$ raises the liquidus temperature too high; and excess SrO depresses the strain point to too low a value. The inclusion of minor amounts of BaO, CaO, and $B_2O_3$ can be useful in improving certain of the physical properties displayed by the inventive glasses. To illustrate, up to 10% total BaO and/or CaO can act to reduce the liquidus temperature and up to 5% $B_2O_3$ can be helpful in improving the meltability of the glasses. Nevertheless, the total of those and any other extraneous addition ought not to exceed about 12% to prevent a negative impact on the glass properties.

A very vital discovery derived from the research program was the need for excluding MgO from the glass composition. Thus, it was observed that more magnesium silicate precipitated out of the glass at a higher temperature than the other alkaline earth metal silicates, thereby, in effect, leading to greatly increased crystal growth. Consequently, not only will the inventive glass composition be essentially free from alkali metal oxides to prevent the migration of alkali metal ions, but also will be essentially free from MgO; that is, no substantive amount of an alkali metal-containing material or a magnesium-containing material will be included in the batch materials.

U.S. Pat. No. 4,634,684 (Dumbaugh, Jr.) discloses glasses especially designed for use as substrates for flat panel display devices, those glasses consisting essentially, in mole percent, of 9-12% SrO, 9-12% $Al_2O_3$, and 77-82% $SiO_2$. As is immediately evident, those glasses contain less SrO and more $SiO_2$ than the present inventive glasses. The glasses of the patent demonstrated annealing points of at least 850° C., thus strongly recommending their utility as substrates in displays employing poly-Si thin film transistors. Unfortunately, however, batches for those glasses required melting temperature in the vicinity of 1800° C., thereby rendering them economically unfeasible in current commercial glass melting units.

Hence, the present inventive glasses are distinctive in exhibiting strain points in excess of 675° C., but yet having the capability of being melted at temperatures not exceeding about 1600° C., thereby enabling them to be melted in current commercial glass melting units. Measurements of liquidus temperatures have ranged between about 1100°-1325° C. and linear coefficients of thermal expansion (25°-300° C.) have ranged between about $45-62 \times 10^{-7}$/°C.

The preferred glass compositions consist essentially, in mole percent, of:

| $SiO_2$ | 67-70 | CaO and/or BaO | 0-10 |
|---|---|---|---|
| $Al_2O_3$ | 7-9 | $B_2O_3$ | 0-5 |
| SrO | 21-25 | [CaO and/or BaO] + $B_2O_3$ | 0-12 |

Whereas it is not possible mathematically to precisely convert mole percent to weight percent, the following ranges represent approximations of the inventive glass compositions in terms of weight percent:

| $SiO_2$ | 50-65 | CaO and/or BaO | 0-12 |
|---|---|---|---|
| $Al_2O_3$ | 8-15 | $B_2O_3$ | 0-5 |
| SrO | 22-38 | [CaO and/or BaO] + $B_2O_3$ | 0-14 |

PRIOR ART

In addition to U.S. Pat. No. 4,634,684 discussed above, the following materials are cited as having relevance to the present inventive compositions.

U.S. Pat. No. 4,180,618 (Alpha et al.) reports the fabrication of electronic devices comprised of a thin film of silicon deposited upon a glass substrate, the glass exhibiting a linear coefficient of thermal expansion between $32-42 \times 10^{-7}$/°C. and consisting essentially, in weight percent, of 55-75% $SiO_2$, 5-25% $Al_2O_3$, and at least one alkaline earth metal oxide selected from the group in the indicated proportions of 9-15% CaO, 14-20% SrO, and 18-26% BaO. Not only is SrO merely an optional ingredient which is not present in the preferred compositions, but also the level thereof is below the minimum required in the instant inventive glasses.

U.S. Pat. No. 4,634,683 (Dumbaugh, Jr.) describes glasses especially developed for use as substrates in flat panel display devices. Those glasses displayed annealing points higher than 900° C., linear coefficients of expansion between 30-40×10$^{-7}$/°C., and consisted essentially, in mole percent, of 68-80% $SiO_2$, 18-26% $Al_2O_3$, and 2-6% BaO and/or SrO. As can be observed, the $Al_2O_3$ concentrations are far higher and the SrO levels much lower than required in the present inventive compositions.

U.S. Pat. No. 4,824,808 (Dumbaugh, Jr.) also sets forth glasses particularly designed for use as substrates in liquid crystal display devices. The glasses exhibited linear coefficients of thermal expansion between 20-60×10$^{-7}$/°C., strain points over 625° C. (no exemplary glass composition reported in the patent demonstrated a strain point above 650° C.), and consisted essentially, in cation percent, of 52-58% $SiO_2$, 20-23% $B_2O_3$, 0-4% MgO, 0-6% CaO, 0-6% SrO, 1-9% BaO, 8-12% MgO+CaO+SrO+BaO, 0-3% ZnO, and 0-1% fining agent. Not only is the level of SrO far below that demanded in the instant inventive glasses, but also the $B_2O_3$ concentrations are much greater than the maximum permitted in the subject inventive glasses.

Kh. Sh. Iskhakov, "Region of Glass Formation in a Strontium Oxide-Silicon Dioxide System", Uzb. Khim. Zh. 15 [1], 10-12 (1971) describes the preparation of glasses composed in mole percent, of 25-60% SrO, 5-30% $Al_2O_3$, and 35-65% $SiO_2$. The very broad ranges marginally overlap those required in the present inventive glasses. Nevertheless, not only is there no mention whatever of the exceptional utility of glasses within the composition intervals of the instant invention as substrates for liquid crystal display devices, but also the publication cited no specific glass having a composition within the ranges required in the subject invention.

Moreover, Kh. Sh. Iskhakov in "Properties of Glasses in the Strontia-Alumina-Silica System", Uzb. Khim. Zh. 15 [2], 79-81 (1971) discusses several compositions of glasses having compositions within the ranges of the above Iskhakov literature reference. The author noted that the glasses exhibited coefficients of thermal expansion between 64-97×10$^{-7}$/°C.; hence, higher than the thermal expansions in the present inventive glasses.

G. I. Zhuravlev, A. I. Kugnetsov, T. I. Semenova, and N. G. Suikovskaya, *Glass*, USSR SU870,365, Jan. 7, 1984, disclose the preparation of glasses demonstrating high softening points and special electrical resistivities, the glasses consisting, in weight percent, of 25-35% SrO, 11-20% $Al_2O_3$, and 41-63% $SiO_2$. Not only is there no reference whatever to the special utility of SrO-$Al_2O_3$-$SiO_2$ glasses as substrates in liquid crystal display devices, but also no specific exemplary glass composition is provided which comes within the ranges of the present inventive glasses.

DESCRIPTION OF PREFERRED EMBODIMENTS

Table I below lists a number of glass compositions, expressed in terms of parts by weight on the oxide basis, illustrating the compositional parameters of the present invention. Because the sum of the individual components totals or very closely approximates 100, for all practical purposes the tabulated values may be considered as reflecting weight percent. The actual batch ingredients may comprise any materials, either oxides or other compounds, which, when melted together with the other batch materials, will be converted into the desired oxide in the proper proportions. For example, $SrCO_3$ and $CaCO_3$ can provide the source of SrO and CaO, respectively.

The batch ingredients were compounded, tumble mixed together thoroughly to aid in producing a homogeneous melt, and charged into platinum crucibles. After placing lids thereon, the crucibles were introduced into a furnace operating at about 1600° C. and the batches melted for about 16 hours. Thereafter, the crucibles were withdrawn from the furnace, the melts poured onto steel plates to yield glass slabs having dimensions of about 30 cm×15 cm×1 cm, and those slabs transferred immediately to an annealer operating at about 775° C. (The Examples labelled 7059, 1733, and 1724 have been inserted as comparative examples and refer to glasses commercially marketed by Corning Incorporated.)

Although the above description represents a laboratory melting procedure, it must be recognized that the inventive glasses are capable of being melted and formed utilizing large scale, commercial glass melting and forming equipment. Thus, it will be recalled that the subject glasses were designed to be drawn into thin glass sheet employing the downdraw fusion pipe. Also, whereas not employed in the laboratory melts, conventional fining agents, e.g., $As_2O_3$ and $Sb_2O_3$, may be included in the batches in proper amounts where deemed desirable.

Table I also records measurements of several physical and chemical properties determined on the listed glasses in accordance with techniques conventional in the glass art. Hence, the annealing point (A.P), strain point (St.P) and internal liquidus temperature (Liq.) employing a platinum boat are tabulated in ° C. Also reported are the linear coefficient of thermal expansion (Exp.) over the temperature range of 25°-300° C., expressed in terms of ×10$^{-7}$/°C., the density (Den.) in terms of grams/cm$^3$, and the viscosity of the glass at the liquidus temperature (Vis.) in terms of poises. Finally, an evaluation of the resistance to attack by acids was determined by measuring the weight loss (W. L.) in terms of mg/cm$^2$ after an immersion for 24 hours in a bath of 5% by weight aqueous solution of HCl, the bath operating at a temperature of 95° C.

Table II records the glass compositions in terms of mole percent.

TABLE I

|  | 7059 | 1733 | 1724 |  |  |
|---|---|---|---|---|---|
|  | 1 | 2 | 3 | 4 | 5 |
| $SiO_2$ | 50.0 | 57.0 | 56.8 | 56.4 | 63.6 |
| $Al_2O_3$ | 10.0 | 15.2 | 16.4 | 11.1 | 13.0 |
| SrO | — | 3.6 | — | 32.4 | 23.4 |
| CaO | — | 3.9 | 7.8 | — | — |
| BaO | 25.0 | 5.2 | 8.0 | — | — |
| $B_2O_3$ | 15.0 | 12.4 | 4.7 | — | — |
| MgO | — | 1.4 | 5.8 | — | — |
| A.P. | 639 | 695 | 721 | 762 | 798 |
| St.P. | 593 | 640 | 674 | 718 | 748 |
| Liq. | 986 | 1041 | 1100 | 1100 | 1250 |
| Exp. | 46 | 36.5 | 44 | 58.4 | 45.0 |
| Den. | 2.76 | 2.49 | 2.64 | 2.94 | 2.726 |
| Vis. | 1.8 × 10$^6$ | 10$^6$ | 10$^5$ | 2.8 × 10$^5$ | — |
| W.L. | 12 | 4 | 0.25 | 0.03 | 0.01 |

TABLE I-continued

| | 6 | 7 | 8 | 9 | 10 |
|---|---|---|---|---|---|
| $SiO_2$ | 61.1 | 61.2 | 60.0 | 60.0 | 58.7 |
| $Al_2O_3$ | 10.0 | 12.8 | 11.3 | 14.1 | 8.4 |
| SrO | 28.9 | 26.0 | 28.7 | 25.9 | 32.8 |
| A.P. | 764 | 782 | 771 | 789 | 753 |
| St.P. | 715 | 732 | 724 | 740 | 707 |
| Liq. | 1260 | 1215 | 1215 | 1321 | 1163 |
| Exp. | 52.4 | 50.7 | 54.1 | 48.7 | 60.4 |
| Den. | 2.839 | 2.788 | — | — | 2.951 |
| W.L. | 0.01 | 0.01 | — | — | — |

| | 11 | 12 | 13 | 14 | 15 |
|---|---|---|---|---|---|
| $SiO_2$ | 58.8 | 58.8 | 57.6 | 56.4 | 56.4 |
| $Al_2O_3$ | 11.2 | 14.0 | 11.2 | 9.7 | 11.1 |
| SrO | 30.0 | 27.1 | 31.2 | 33.8 | 32.4 |
| A.P. | 767 | 786 | 763 | 756 | 761 |
| St.P. | 723 | 739 | 718 | 713 | 718 |
| Liq. | 1201 | 1308 | 1155 | 1145 | 1100 |
| Exp. | 55.6 | 51.2 | 57.1 | 58.5 | 58.4 |
| Den. | 2.878 | 2.829 | 2.907 | 2.968 | 2.935 |
| Vis. | — | — | — | — | $2.6 \times 10^5$ |
| W.L. | — | — | 0.01 | 0.02 | 0.03 |

| | 16 | 17 | 18 | 19 | 20 |
|---|---|---|---|---|---|
| $SiO_2$ | 55.3 | 56.2 | 54.2 | 51.9 | 57.1 |
| $Al_2O_3$ | 11.0 | 11.0 | 11.7 | 10.8 | 12.1 |
| SrO | 33.6 | 34.8 | 34.2 | 37.2 | 26.8 |
| CaO | — | — | — | — | 3.9 |
| A.P. | 759 | 754 | 763 | 751 | 761 |
| St.P. | 716 | 710 | 720 | 709 | 718 |
| Liq. | 1145 | 1150 | 1160 | 1150 | 1205 |
| Exp. | 59.1 | 62.0 | 59.3 | 64.5 | 55.9 |
| Den. | 2.965 | 3.003 | 2.988 | 3.064 | 2.879 |
| W.L. | 0.02 | 0.09 | — | 0.17 | — |

| | 21 | 22 | 23 |
|---|---|---|---|
| $SiO_2$ | 58.1 | 56.1 | 59.3 |
| $Al_2O_3$ | 12.4 | 10.9 | 11.3 |
| SrO | 22.3 | 24.9 | 27.4 |
| CaO | 7.2 | — | — |
| BaO | — | 8.2 | — |
| $B_2O_3$ | — | — | 1.9 |
| A.P. | 759 | 750 | 741 |
| St.P. | 717 | 705 | 698 |
| Liq. | 1175 | 1120 | 1220 |
| Exp. | 56.4 | 57.5 | 51.4 |
| Den. | 2.83 | — | 2.817 |
| W.L. | — | — | 0.02 |

TABLE II (Mole %)

| | 1 | 2 | 3 | 4 | 5 | 6 | 7 | 8 |
|---|---|---|---|---|---|---|---|---|
| $SiO_2$ | 63.5 | 65.5 | 62.6 | 69.0 | 75 | 73 | 73 | 72 |
| $Al_2O_3$ | 7.5 | 10.3 | 10.7 | 8.0 | 9 | 7 | 9 | 8 |
| SrO | — | 2.4 | — | 23.0 | 16 | 20 | 18 | 20 |
| CaO | — | 4.8 | 9.2 | — | — | — | — | — |
| BaO | 12.5 | 2.3 | 3.5 | — | — | — | — | — |
| $B_2O_3$ | 16.5 | 12.3 | 4.5 | — | — | — | — | — |
| MgO | — | 2.4 | 9.5 | — | — | — | — | — |

| | 9 | 10 | 11 | 12 | 13 | 14 | 15 | 16 |
|---|---|---|---|---|---|---|---|---|
| $SiO_2$ | 72 | 71 | 71 | 71 | 70 | 69 | 69 | 68 |
| $Al_2O_3$ | 10 | 6 | 8 | 10 | 8 | 7 | 8 | 8 |
| SrO | 18 | 23 | 21 | 19 | 22 | 24 | 23 | 24 |

| | 17 | 18 | 19 | 20 | 21 | 22 | 23 |
|---|---|---|---|---|---|---|---|
| $SiO_2$ | 67 | 67 | 65 | 68 | 67.5 | 70 | 71 |
| $Al_2O_3$ | 8 | 8.5 | 8 | 8.5 | 8.5 | 8 | 8 |
| SrO | 25 | 24.5 | 27 | 18.5 | 15 | 18 | 19 |
| CaO | — | — | — | 5 | 9 | — | — |
| BaO | — | — | — | — | — | 4 | — |
| $B_2O_3$ | — | — | — | — | — | — | 2 |

Example 15 constitutes the most preferred composition.

Whereas the present invention has been described in detail utilizing the inventive glasses as substrates in liquid crystal display devices, it will be understood that they can be employed in other flat panel display devices such as electroluminescent displays and plasma displays.

We claim:

1. In a flat panel display device containing a flat, transparent glass substrate carrying polycrystalline silicon thin film transistors, the improvement wherein said glass is capable of being melted at temperatures not exceeding about 1600° C., it exhibits a strain point over 675° C., a liquidus temperature no higher than 1325° C., a long term stability when in contact with platinum metal and high temperature refractory ceramic materials, and, being essentially free from alkali metal oxides and MgO, consists essentially, expressed in terms of mole percent on the oxide basis, of:

| $SiO_2$ | 67–70 | CaO and/or BaO | 0–10 |
|---|---|---|---|
| $Al_2O_3$ | 7–9 | $B_2O_3$ | 0–5 |
| SrO | 21–25 | [CaO and/or BaO] + $B_2O_3$ | 0–12. |

* * * * *